United States Patent

Kiyosawa et al.

[11] Patent Number: 5,984,048
[45] Date of Patent: Nov. 16, 1999

[54] LUBRICANT SUPPLYING MECHANISM FOR A WAVE GEAR DRIVE

[75] Inventors: Yoshihide Kiyosawa; Hiroshi Takizawa; Masaru Kobayashi; Hideo Asawa, all of Nagano-ken, Japan

[73] Assignee: Harmonic Drive Systems, Inc., Tokyo, Japan

[21] Appl. No.: 08/926,430

[22] Filed: Oct. 21, 1997

[51] Int. Cl.[6] ............................. F16H 1/32; F16H 57/04
[52] U.S. Cl. ............................ 184/6.12; 74/467; 74/640
[58] Field of Search .................. 74/467, 640; 184/6.12; 277/402, 407, 549, 560

[56] References Cited

U.S. PATENT DOCUMENTS

| | | | |
|---|---|---|---|
| 3,523,488 | 8/1970 | Robinson | 74/640 |
| 4,216,677 | 8/1980 | Tuzson | 74/640 |
| 4,421,329 | 12/1983 | Jelinek | 277/560 |
| 4,585,236 | 4/1986 | Simmons et al. | 277/402 |
| 5,676,221 | 10/1997 | Renk et al. | 184/6.12 |
| 5,775,178 | 7/1998 | Asawa et al. | 74/640 |

FOREIGN PATENT DOCUMENTS

| | | | |
|---|---|---|---|
| 0057058 | 4/1985 | Japan | 184/6.12 |
| 6-29549 | 8/1994 | Japan | |
| 0578515 | 10/1977 | U.S.S.R. | 74/640 |

*Primary Examiner*—Thomas R. Hannon
*Assistant Examiner*—Chong H. Kim
*Attorney, Agent, or Firm*—Burns, Doane, Swecker & Mathis LLP

[57] ABSTRACT

A wave gear drive (1) has a silk-hat shaped flexible external gear (12) comprising a cylindrical body (13), a circular diaphragm (14), a circular boss (15) formed integrally on the diaphragm (14), and external teeth (16) formed on the body (13) at a side of an open end (13a) thereof. The boss (13) of the flexible external gear, a cross roller bearing (7) and the rigid internal gear (11) are arranged between first and second end plates (2, 3) so as to define a substantially sealed inside space of the wave gear drive (1). A resilient seal ring member (8) is mounted on the open end (13a) of the flexible external gear to divide the inside space into an inside portion (9) where a first lubricant having a high viscosity is supplied and an outside portion (10) where a second lubricant having a low viscosity is supplied. These lubricants are prevented from being mixed with each other during operation, thus proper lubrication to portions of the teeth (11a, 16) of the gears (11, 12) and to a wave bearing (19) of the wave generator (17) can be maintained.

15 Claims, 3 Drawing Sheets

LUBRICANT SUPPLYING MECHANISM FOR A WAVE GEAR DRIVE

BACKGROUND OF THE INVENTION

1. Field of the Invention

The present invention relates to a wave gear drive, and in particular to a lubricant supplying mechanism for a wave gear drive that can supply lubricants appropriately to a wave bearing portion and meshing portions between internal and external gears, respectively.

2. Related Art Description

A typical wave gear drive is constituted by a cylindrical rigid internal gear having inner teeth, a cylindrical flexible external gear having external teeth meshable with the inner teeth, and an elliptical wave generator which flexes the external gear elliptically to mesh the external teeth partially with the internal teeth of the internal gear and rotates the meshed portions of teeth circumferentially. The wave generator comprises a rigid cam plate having an elliptical profile and a wave bearing fixed between the circumferential outer surface of the cam plate and the circumferential inner surface of the external gear.

When the rigid cam plate is rotated, relative rotation is generated between the internal and external gear due to the difference in tooth number between the internal teeth and the external teeth. Generally, the tooth number of the internal teeth is larger than that of the external teeth by two, and when high speed rotation is input to the wave generator from a motor or the like, an output rotation whose speed is greatly reduced can be obtained from the flexible external gear by fixing the rigid internal gear so as not to rotate.

In a conventional wave gear drive, inside and outside portions of the flexible external gear are in communication with each other, and therefore lubricant can be circulated freely between the inside and outside portions thereof. Circulation of the lubricant may prevent portions to be lubricated from being supplied with sufficient lubricant.

Further, in a conventional wave gear drive, a common lubricant is supplied to meshing portions of the internal and external gears and to the wave bearings. It is, however, preferable that a lubricant to the teeth of the internal and external gears which are located outside the flexible external gear is of a type having high viscosity because it has high film strength. While, a lubricant to the wave bearing located inside the flexible external gear is preferably of low viscosity because agitating resistance thereof is low.

In consideration of the above point, it is preferable to supply different lubricants to the teeth portion and the wave bearing. However, the inside and outside portions of the flexible external gear are in communication with each other as mentioned above, the lubricants of different type may mix with each other during operation of the wave gear drive. This may cause to degrade the properties of both lubricants, and in the end, effects or advantages obtained by using different lubricants cannot be expected.

SUMMARY OF THE INVENTION

Accordingly, an object of the present invention is to provide a lubricant supplying mechanism for a wave gear drive which is able to prevent lubricant from circulating between inside and outside portions of an flexible external gear so that sufficient lubricant is supplied to portions to be lubricated.

Another object of the present invention is to provide a lubricant supplying mechanism for a wave gear drive which is able to supply lubricants of different type to teeth and wave bearing portions in a manner that they are not mixed with each other during operation.

In order to realize the above and other objects, a lubricant supplying mechanism for a wave gear drive which comprises a circular rigid internal gear formed on a circumferential inner surface thereof with internal teeth, a circular flexible external gear located inside the rigid internal gear and formed on a circumferential outer surface thereof with external teeth meshable with the internal teeth, and a wave generator having a wave bearing fixed on a circumefential inner surface of the flexible external gear, characterized in which.

resilient seal ring means is provided to seal substantially between inside and outside portions of the flexible external gear so that it prevents lubricant from circulating therebetween.

As the flexible external gear, a silk-hat shaped flexible external gear may be utilized. Altenatively, a cup-shaped flexible external gear may be utilized.

The flexible external gear of a silk hat shape has a cylindrical body, a circular diaphragm extending radially and outward from one end of the body, and a circular boss formed integrally on an outer peripheral edge of the diaphragm, and external teeth formed on a circumferential outer surface of the body at a side of an open end thereof. In this case, a first end plate anda second end plate are also provided, between which the boss of the flexible external gear, the bearing means and the rigid internal gear are arranged, so that a substantially sealed inside space is defined in the wave gear drive. Further, the resilient seal ring means is positioned between the open and of the flexible external gear and the second end plate facing to the open end so that the inside space of the wave gear drive is divided into the inside and outside portions of the flexible external gear.

On the other hand, a cup shaped flexible external gear has an cylindrical body, a circular diaphragm extending radially and inward from one end of the body, and a circular boss formed integrally on a center of the diaphragm, and external teeth formed on a circumferential outer surface of the body at a side of an open end thereof. In this case also, a first end plate and a second end plate are provided, between which the rigid internal gear is arranged so as to define a substantially sealed inside space of the wave gear drive The resilient seal ring means is positioned between the open end of the flexible external gear and the second end place facing to the open end so that the inside space of the wave gear drive is divided into the inside and outside portion of the flexible external gear.

In a preferred embodiment, the resilient seal ring means has a first end portion which is mounted on the open end of the body portion of the external flexible gear and a second end portion which abuts resiliently against an inner-side end surface of the end plate. It is preferable that the first end portion of the resilient seal ring means is mounted on the open end of the body portion of the external flexible gear so that a circular engagement projection is formed on the first end portion of the resilient seal ring means and a circular engagement groove is formed on the open end of the body portion for releasably receiving the engagement projection. The circular engagement projection may be formed on the open end of the body portion and the circular engagement grove on the first end portion of the resilient seal ring means.

In another preferred embodiment, the resilient seal ring means is inserted in a resiliently deformed condition between the open end of the body of the flexible external gear and an inner-side surface of the second end plate.

Further, in a preferred embodiment, a first lubricant is supplied to the internal and external teeth of the gears, while a second lubricant having a lower viscosity is supplied to the wave bearing of the wave generator.

According to the present invention, the outside and inside portions or the flexible external gear are sealed by the resilient seal ring means, to thereby prevent lubricant from circulating between the outside and inside portions of the flexible external gear during operation of the wave gear drive. Hence, a sufficient amount of lubricant can be supplied to the respective portions where lubrication is needed. In addition, where the first lubricant of high viscosity is supplied to the tooth portions of the internal and external gears and the second lubricant of low viscosity to the wave bearing, these lubricants are prevented from being mixed during operation, whereby lubricating properties of the respective lubricants can be maintained as they are. Thus, it can be realized appropriate lubrication to both the tooth portions of the internal and external gears and the wave bearing.

DETAILED DESCRIPTION OF THE PREFERRED EMBODIMENTS (Example 1)

Figure 1:
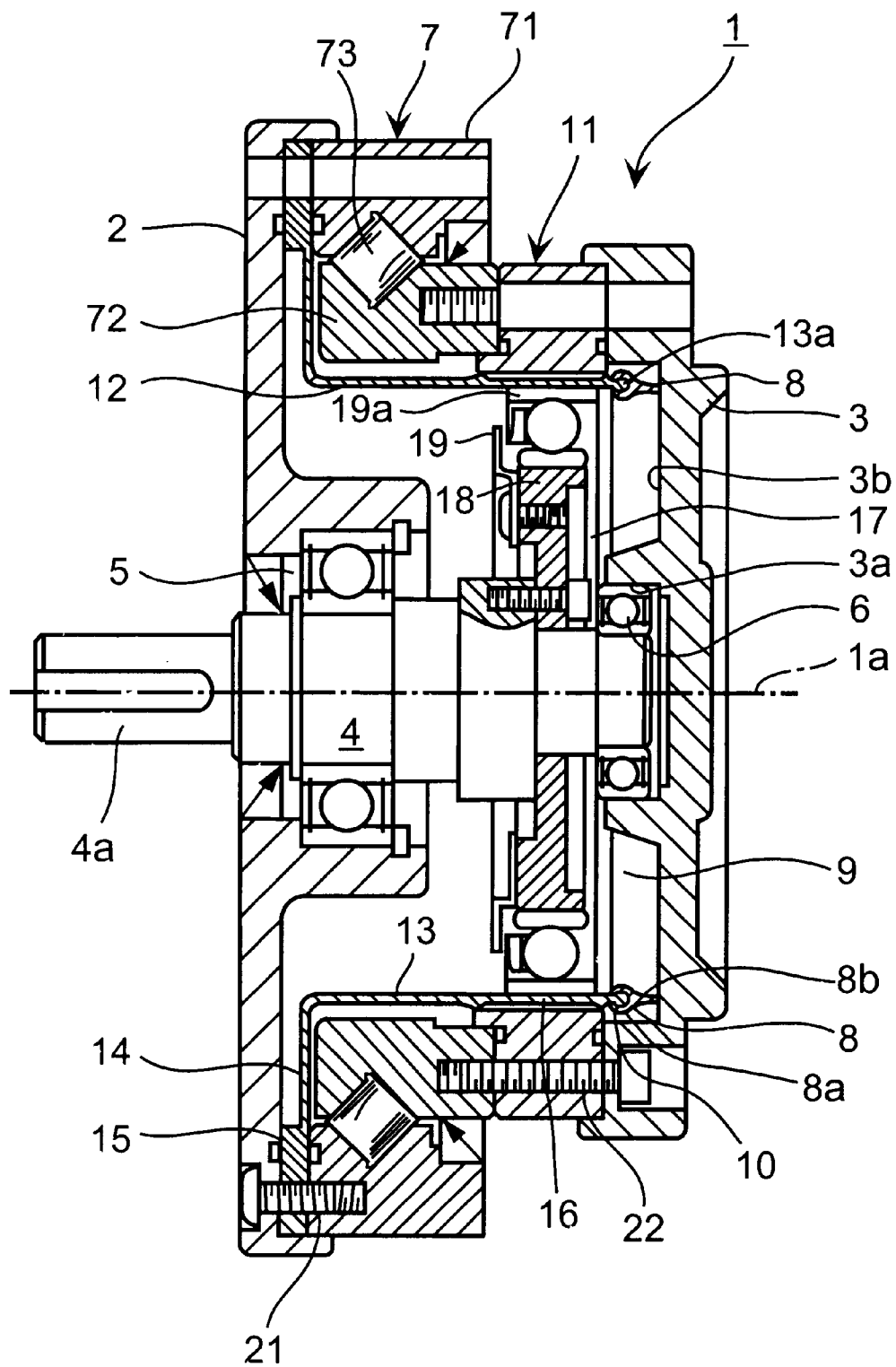
FIG. 1 is a longitudinal sectional view of an example of a wave gear drive according to the present invention.

Referring now to FIG. 1, there is shown a silk hat type wave gear drive having a lubricant supplying mechanism according to the present invention. The silk hat type wave gear drive 1 has first and second end plates 2, 3 arranged parallel to each other in an axial direction 1a of the wave gear drive. The wave gear drive 1 also has a input rotational shaft 4 which is arranged along the axial direction 1a. The input rotational shaft 4 has one end which penetrates through the first end plate 2 to project outward and is rotatably supported by the first end plate 2 by means of a ball bearing 5. The other end of the input rotational shaft 4 is also rotatably supported on a circular recess 3a of the second end plate 3 by means of a ball bearing 6. Thus, the input rotational shaft 4 is supported on its both ends by the first and second end plates 2, 3, respectively. A projecting end portion 4a of the shaft 4 which projects from the first end plate 2 is connected to a high speed rotational member such as a motor output shaft or the like (not shown).

Between the first and second end plates 2, 3, a cross roller bearing 7 is arranged at the side of the first end plate 2, and a circular rigid internal gear 11 at the side of the second end plate 3. A flexible external gear 12 of the silk hat shape is positioned inside the cross roller bearing 7 and the circular rigid internal gear 11, which comprises a cylindrical body 13, a circular diaphragm 14 extending outward in a radial direction from an open end of the body 13 at the side of the first end plate 2, a circular boss 15 integrally formed on the outer peripheral edge of the diaphragm 14, and external teeth 16 formed on the outer circumferential surface portion at the side of the other open end of the body 13.

A wave generator 17 is fixed inside the body 13 of the external gear where the external teeth 16 are formed. The wave generator 17 has a rigid cam plate 18 having an elliptical shape and a wave bearing 19 fixed on the outer circumfential surface of the rigid cam plate 18. The rigid cam plate 18 is fixedly mounted on the input rotational shaft 4.

On the other hand, the above-mentioned cross roller bearing 7 has an outer race 71, an inner race 72 and a plurality of rollers 73 arranged rotatably between the outer and inner races 71, 72 in a circumferential direction. The outer race 71 of the cross roller bearing 7 is fixedly fastened to the first end plate 2 by means of fastening bolts 21 in a condition that the circular boss 15 of the external flexible gear 12 is held between the outer race 71 and the first end plate 2. Namely, the first end plate 2, the flexible external gear 12 and the outer race 71 of the cross roller bearing 7 are fixedly fastened together by the fastening bolts 21.

Likewise, the inner race 72 of the cross roller bearing 7 is fixedly fastened to the second end plate 3 by means of fastening bolts 22 such that the rigid internal gear 11 is held between the inner race 72 and the second end plate 3.

Accordingly, relative rotation can be obtained between the flexible external gear 12 fastened to the first end plate 2 and the rigid internal gear 11 fastened to the second end plate 3 by means of the cross roller bearing 7. Typically, one of these end plates 2, 3 is connected to a driven side (not shown) and the other is fixed so as not to rotate, whereby input rotation of the input rotational shaft 4 is greatly reduced in speed by a known reduction principle of the wave gear drive 1 and is transferred to the driven side.

In the present example, the flexible external gear 12 has an open end 13a facing the second end plate 3, on which a resilient seal ring member 8 is mounted. The seal ring member 8 can be made from rubber or resin. The seal ring member 8 has a first end portion 8a which is releasably attached to the open end 13a of the external gear 12 and a second end portion 8b which is forced to press against an inner side surface 3b of the second end plate 3. The inner side surface 3b is a smooth surface so that friction between the surface 3b and the seal ring member 8 can be reduced.

Figure 2A:
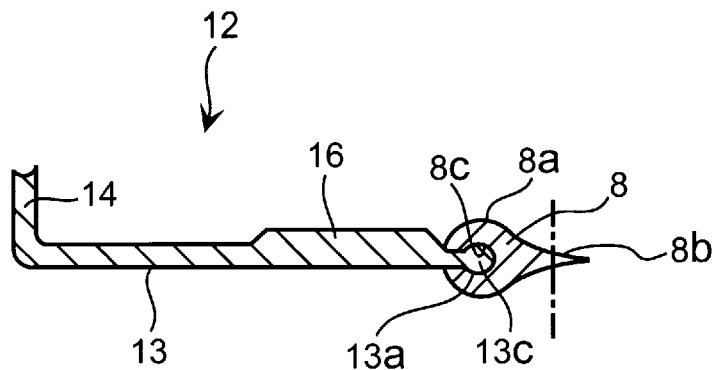
FIGS. 2(A), 2(B), and 2(C) illustrate resilient seal ring members.
Figure 2B:
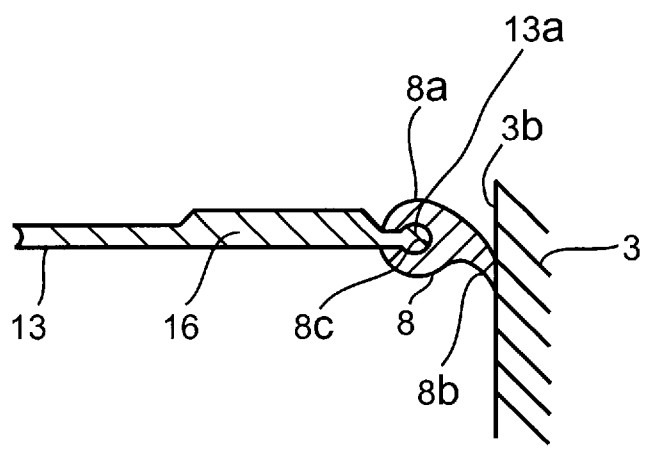

FIGS. 2(A) and 2(B) illustrate the resilient seal ring member 8 attached to the open end 13a of the flexible external gear 12. As shown in FIG. 2(A), the open end 13a is formed with an engagement projection 13c in the form of a swelling portion having a circular cross section and extending in a circumferential direction. While, the first end portion 8a of the resilient seal ring member 8 is formed with an engagement groove 8c for receiving the engagement projection 13c. The engagement groove 8c has a complementary cross sectional shape to the engagement projection 13c. More specifically, when the engagement projection 13c is forced to insert into the engagement groove 8c, the engagement groove 8c is resiliently made open to receive the engagement projection 13c therein. After the engagement projection 13c is completely inserted into the engagement groove 8c, the engagement groove 8c is resiliently restored to its original shape, whereby the resilient seal ring 8 is prevented from coming out of the open end 8a of the flexible external gear 12.

FIG. 2(B) shows a state of the resilient seal ring member 8 after assembled in the wave gear drive 1. The seal ring member 8 is formed so that the width thereof measured along the axial direction 1a of the drive 1 is larger than a gap between the open end 13a of the flexible external gear 12 and the second end plate 3. Therefore, when assembled, the seal ring member 8 is forced to press against the second end plate 3 and is resiliently bent at its second end portion 8b. In the present example, the second end portion 8b is formed so that the thickness thereof becomes thin toward its tip, whereby the second end portion 8b comes in intimate contact with the inner side surface 3b of the second end plate 3.

On the other hand, the wave gear drive 1 of the present example is designed so that a lubricant of high viscosity is supplied to the tooth portions of the internal and external gears 11, 12, while a lubricant of low viscosity is supplied to the wave bearing 19 of the wave generator 17.

According to the wave gear drive 1 as constituted above, there is formed an inside space defined by the first end plate 2, the second end plate 3, the rigid internal gear 11, the cross roller bearing 7 and the circular boss 15 of the flexible external gear 12. Further, the inside space is divided into the inside and outside portions 9 and 10 of the flexible external gear 12 by means of the resilient seal ring member 8. Thus, lubricant supplied in the wave gear drive 1 is not allowed to circulate between the inside portion 9 and the outside portion 10.

As a result, the wave bearing 19 is supplied with a sufficient amount of lubricant having a low viscosity at the side or the inside portion 9, and at the same time the tooth meshing portions between the internal and external gears 11, 12 are also supplied with a sufficient amount of lubricant having a high viscosity at the side of the outside portion 10. In addition, the lubricants of high and low viscosities will not mix with each other during operation of the wave gear drive 1, and therefore proper lubrication can be maintained for the wave bearing 19 and the tooth portions of the internal and external gears 11, 12.

In the wave gear drive 1, the resilient seal ring member 8 may be formed with the engagement projection, and the open end of the flexible external gear may be formed with the engagement groove. The resilient seal ring member 8 may be adhered to the open end of the flexible external gear. Further, the resilient seal ring member 8 is not limited to the above-mentioned shape, but may be any other shape. Furthermore, the resilient seal ring member 8 may be made from any materials other than rubber or resin.

Although the above wave gear drive 1 is of a silk hat type having a silk hat shaped flexible external gear, the present invention can also be applied to a wave gear drive of a cup type having a cup shaped flexible external gear.

In addition, the input rotational shaft 4 may have both ends projecting from the first and second end plates 2, 3, respectively. This enables to connect a driving source to either sides of the first and second end plates. The input rotational shaft 4 may be a hollow shaft instead of a solid one. Further, a ball bearing mechanism may be used in place of the cross roller bearing 7.

(Example 2)

Figure 2C:
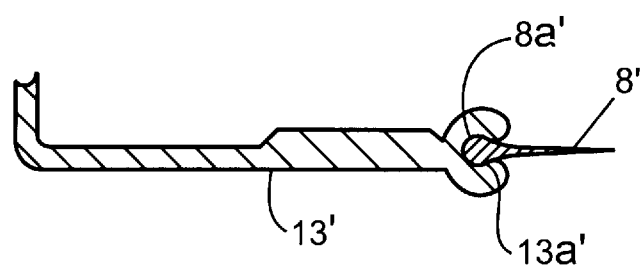
Figure 3:
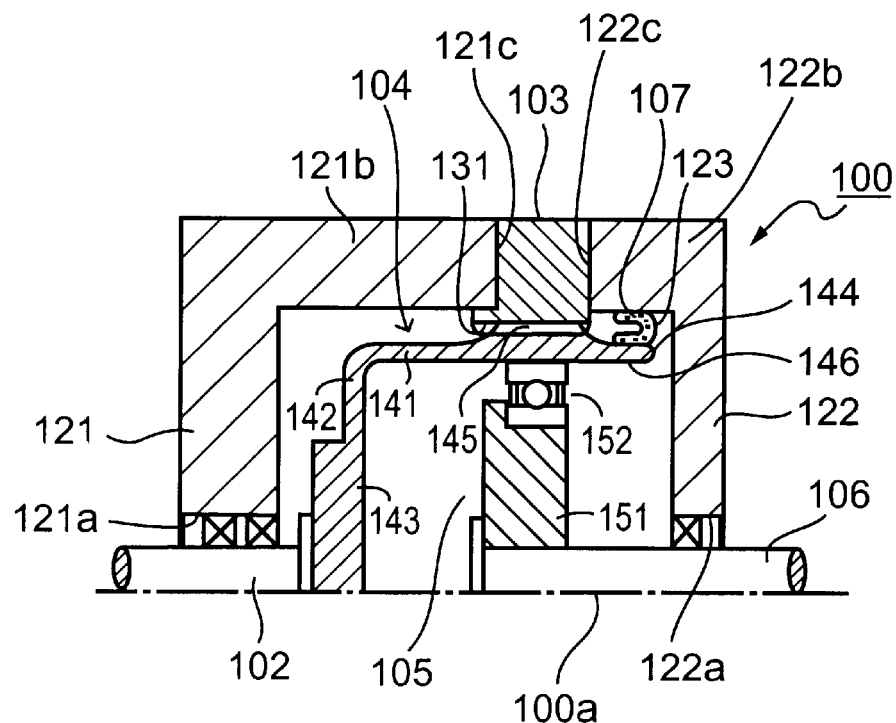
FIG. 3 is a half longitudinal sectional view of another example of a wave gear drive according to the present invention; and, FIG. 4 is a modified example of the wave gear drive of FIG. 3.

FIG. 2(C) shows another embodiment, wherein the open end 13' includes a circular engagement groove 13a' and the seal ring member 8' includes an engagement projection 8a'. FIG. 3 shows another example of a wave gear drive having a lubricant supplying mechanism according to the present invention. As shown in this figure, the wave gear drive 100 is of a cup type having a circular rigid internal gear 103, a cup-shaped flexible external gear 104 positioned inside the rigid internal gear 103, and an elliptical wave generator 105 fixed inside the flexible external gear 104.

The flexible external gear 104 has a cylindrical body 141, a circular diaphragm 142 extending inward in a radial direction so as to seal one end of the cylindrical body 141, a circular boss 143 integrally formed on the center of the diaphragm 142, and external teeth 145 formed on a circumferential outer surface portion at the side of an open end 144 of the cylindrical body 141. The rigid internal gear 103 is formed on a circumferential inner surface with inner teeth 131 meshable with the external teeth 145. The wave generator 105 has a rigid cam plate 151 having an elliptical shape and a wave bearing 152 fixed on a circumferential outer surface. The rigid cam plate 151 is connected coaxially with an input rotational shaft 106, while the boss 143 of the flexible external gear 104 is connected coaxially with an output rotational shaft 102.

As can be seen from FIG. 3, the wave gear drive 100 also has a first end plate 121 and a second end plate 122. The first and second end plates 121, 122 are formed therein with shaft holes 121a and 122a, through which the output and input rotational shafts 146 and 106 are rotatably arranged, respectively. The first end plate 121 is also formed with a cylindrical portion 121b whose annular end 121c is fixedly connected to an annular end of the rigid internal gear 103. Similarly, the second end plate 122 is formed with a cylindrical portion 122b whose annular end 122c is fixedly connected to the other annular end of the rigid internal gear 103.

In the wave gear drive 100, the cylindrical body 141 of the flexible external gear 104 has an annular portion 146 extending in an axial direction 100a from the portion of the body 141 where the external teeth 145 are formed, and the end of the annular portion 146 is the open end 144 of the body 141. A resilient seal ring member 107 which is resiliently deformed Into a U shape is inserted to seal between the annular portion 148 and a circumferential inner surface 123 of the second end plate 122.

In operation of the wave gear drive 100, when the wave generator 105 is rotated at high speed, tooth meshing portions between the internal and external gear 103, 104 move in a circumferential direction to cause relative rotation therebetween due to the difference in number of teeth thereof. Since the flexible external gear 104 is rotatable supported by the first end plate 121 and the rigid internal gear 103 is fixed so as not to rotate, an output rotation which is greatly reduced in rotational speed can be extracted from the output shaft 102. In order to suppress or prevent frictional wear and the like of relatively rotating portions, lubricant is supplied to those portions. In the present example, a first lubricant having a high viscosity is supplied to the internal and external teeth 131, 145, while a second lubricant having a low viscosity to the wave bearing 152.

According to the wave gear drive 100 as constituted above, the inside space thereof which is defined by the first and second end plates 121, 122 and the rigid internal gear 103 is divided into inside and outside portions of the flexible external gear 104 by means of the resilient seal ring member 107. Therefore, the first and second lubricants having different properties are prevented from being mixed with each other during operation, whereby proper lubrication to the tooth portions of the gears 103, 104 and the wave bearing 152 can be maintained.

Figure 4:
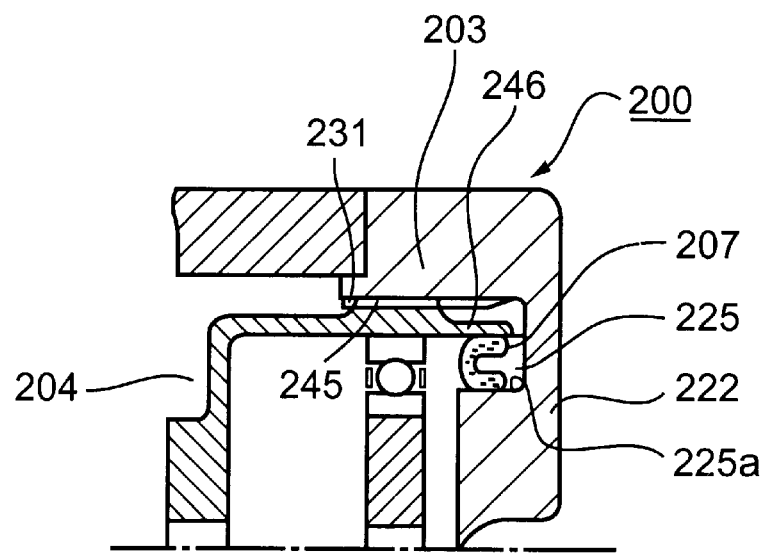

FIG. 4 is a modified example of the above wave gear drive 100 of FIG. 3. In a wave gear drive 200, an rigid internal gear 203 having internal teeth 231 is Integrally formed with a second end plate 222. In addition, the second end plate 222 is formed on the inner side surface with an annular recess 225, into which an annular portion 246 of the flexible external gear 204 is projected. A resilient seal ring member 207 is inserted between a circumfential inner surface of the annular portion 246 and an outer circumferential surface 225a of the annular recess 225. With the resilient seal ring member 207, the inside space of the wave gear drive 200 is divided into the inside and outside portions of the flexible external gear 204, preventing lubricant from circulating therebetween.

We claim:

1. A wave gear drive, comprising:

a circular rigid internal gear formed with a circumferential inner surface thereof with internal teeth, a circular flexible external gear located inside the rigid internal gear and formed with a circumferential outer surface thereof with external teeth which are engageable with the internal teeth, a wave generator having a wave bearing fixed on a circumferential inner surface of the flexible external gear, resilient seal ring means provided to seal substantially between inside and outside portions of the flexible external gear for preventing lubricant from circulating therebetween, a first end plate, a second end plate, and bearing means, the flexible external gear being of a silk hat shape and having a cylindrical body, a circular diaphragm extending radially and outward from one end of the body, a circular boss formed integrally on an outer peripheral edge of the diaphragm, and external teeth formed on a circumferential outer surface of the body at a side of an open end thereof, the boss of the flexible external gear, the bearing means, and the rigid internal gear being arranged between the first and second end plates so as to define a substantially sealed inside space of the wave gear drive, and the resilient seal ring means being engaged between the open end of the flexible external gear and the second end plate which faces the open end so that the inside space of the wave gear drive is divided into the inside and outside portions of the flexible external gear;

wherein the resilient seal ring means has a first end portion which is mounted on the open end of the body of the external flexible gear and a second end portion which abuts resiliently against an inner-side surface of the second end plate.

2. A wave gear drive comprising:

a circular rigid internal gear formed with a circumferential inner surface thereof with internal teeth, a circular flexible external gear located inside the rigid internal gear and formed with a circumferential outer surface thereof with external teeth which are engageable with the internal teeth, a wave generator having a wave bearing fixed on a circumferential inner surface of the flexible external gear, resilient seal ring means provided to seal substantially between inside and outside portions of the flexible external gear for preventing lubricant from circulating therebetween, a first end plate, a second end plate, the flexible external gear being of a cup shape and having a cylindrical body, a circular diaphragm extending radially and inward from one end of the body, a circular boss formed integrally on a center of the diaphragm, and external teeth formed on a circumferential outer surface of the body at a side of an open end thereof, the rigid internal gear being arranged between the first and second end plates so as to define a substantially sealed inside space of the wave gear drive, and the resilient seal ring means being engaged between the open end of the flexible external gear and the second end plate facing to the open end so that the inside space of the wave gear drive is divided into the inside and outside portion of the flexible external gear;

wherein the resilient seal ring means has a first end portion which is mounted on the open end of the body of the external flexible gear and a second end portion which abuts resiliently against an inner side surface of the second end plate.

3. The wave gear drive according to claim 1, wherein the first end portion of the resilient seal ring means is releasably mounted on the open end of the body of the external flexible gear.

4. The wave gear drive according to claim 3, wherein a circular engagement projection is formed on the first end portion of the resilient seal ring means, and a circular engagement groove is formed on the open end of the body for releasably receiving the engagement projection.

5. The wave gear drive according to claim 1, wherein the resilient seal ring means is inserted in a resiliently deformed condition between the open end of the body of the flexible external gear and an inner side surface of the second end plate.

6. The wave gear drive according to claim 1, wherein a first lubricant having a high viscosity is supplied to portions of the internal and external teeth of the gears located in the outside portion of the flexible external gear, while a second lubricant having a low viscosity is supplied to the wave bearing of the wave generator located in the inside portion of the flexible external gear.

7. The wave gear drive according to claim 2, wherein the resilient seal ring means is inserted in a resiliently deformed condition between the open end of the body of the flexible external gear and an inner side surface of the second end plate.

8. The wave gear drive according to claim 2, wherein a first lubricant having a high viscosity is supplied to portions of the internal and external teeth of the gears located in the outside portion of the flexible external gear, while a second lubricant having a low viscosity is supplied to the wave bearing of the wave generator located in the inside portion of the flexible external gear.

9. The wave gear drive according to claim 1, wherein the resilient seal ring means is mounted to the external flexible gear.

10. The wave gear drive according to claim 2, wherein the resilient seal ring means is mounted to the external flexible gear.

11. The wave gear drive according to claim 1, wherein the wave bearing is located in the inside portion and the internal teeth and the external teeth are located in the outside portion.

12. The wave gear drive according to claim 2, wherein the wave bearing is located in the inside portion and the internal teeth and the external teeth are located in the outside portion.

13. The wave gear drive according to claim 9, wherein the wave bearing is located in the inside portion and the internal teeth and the external teeth are located in the outside portion.

14. The wave gear drive according to claim 10, wherein the wave bearing is located in the inside portion and the internal teeth and the external teeth are located in the outside portion.

15. The wave gear drive according to claim 3, wherein a circular engagement projection is formed on the open end of the body of the flexible external gear, and a circular engagement groove is formed on the first end portion of the resilient seal ring means.

* * * * *

UNITED STATES PATENT AND TRADEMARK OFFICE
CERTIFICATE OF CORRECTION

PATENT NO. : 5,984,048
DATED : November 16, 1999
INVENTOR(S) : KIYOSAWA et al.

It is certified that error appears in the above-identified patent and that said Letters Patent is hereby corrected as shown below:

On the cover page, in item [22], "Oct. 21, 1997" should be --Sept. 10, 1997--.

Signed and Sealed this

Twenty-fourth Day of October, 2000

Attest:

Q. TODD DICKINSON

Attesting Officer

Director of Patents and Trademarks